United States Patent
Donderici et al.

(10) Patent No.: US 10,480,310 B2
(45) Date of Patent: Nov. 19, 2019

(54) DETECTING A MOVEABLE DEVICE POSITION USING ELECTROMAGNETIC INDUCTION LOGGING

(71) Applicant: Halliburton Energy Services, Inc, Houston, TX (US)

(72) Inventors: Burkay Donderici, Houston, TX (US); Ahmed E. Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/515,914

(22) PCT Filed: Nov. 6, 2015

(86) PCT No.: PCT/US2015/059492
§ 371 (c)(1),
(2) Date: Mar. 30, 2017

(87) PCT Pub. No.: WO2017/078736
PCT Pub. Date: May 11, 2017

(65) Prior Publication Data
US 2018/0230796 A1   Aug. 16, 2018

(51) Int. Cl.
*E21B 47/09*   (2012.01)
*E21B 34/06*   (2006.01)
*G01V 3/28*   (2006.01)
*E21B 34/00*   (2006.01)

(52) U.S. Cl.
CPC .......... *E21B 47/0905* (2013.01); *E21B 34/06* (2013.01); *G01V 3/28* (2013.01); *E21B 2034/007* (2013.01)

(58) Field of Classification Search
CPC ...... E21B 47/09; E21B 47/12; E21B 47/0905; E21B 2034/007
See application file for complete search history.

(56) References Cited

U.S. PATENT DOCUMENTS

| | | | |
|---|---|---|---|
| 4,292,589 A | * | 9/1981 | Bonner ................ E21B 47/082 324/221 |
| 6,095,248 A | | 8/2000 | Freeman |
| 6,989,764 B2 | | 1/2006 | Thomeer et al. |
| 7,000,698 B2 | | 2/2006 | Mayeu et al. |
| 7,503,398 B2 | | 3/2009 | LoGiudice et al. |
| 7,810,564 B2 | | 10/2010 | Montegomery et al. |

(Continued)

FOREIGN PATENT DOCUMENTS

| CN | 2818777 | 9/2006 |
|---|---|---|
| EP | 2728108 | 5/2014 |

OTHER PUBLICATIONS

International Search Report and the Written Opinion of the International Search Authority, or the Declaration, Aug. 4, 2016, PCT/US2015/059492, 15 pages, ISA/KR.

*Primary Examiner* — David Carroll
(74) *Attorney, Agent, or Firm* — Haynes and Boone, LLP (57) ABSTRACT

The operational position of a moveable device is detected using an electromagnetic induction logging tool. The logging tool generates a baseline log of the moveable device in a non-actuated position, and a response log of the moveable device in an actuated position. The baseline and response logs are then compared in order to determine the operational position of the moveable device.

22 Claims, 5 Drawing Sheets

(56) References Cited

U.S. PATENT DOCUMENTS

| | | | |
|---|---|---|---|
| 8,836,325 B2 | 9/2014 | Prost et al. | |
| 2008/0236819 A1 | 10/2008 | Foster et al. | |
| 2010/0044108 A1* | 2/2010 | Bespalov | E21B 47/022 175/24 |
| 2010/0109906 A1* | 5/2010 | Montgomery | E21B 34/14 340/853.2 |
| 2011/0185806 A1* | 8/2011 | Pfutzner | G01V 7/06 73/152.54 |
| 2014/0239959 A1* | 8/2014 | Clarkson | G01V 3/10 324/338 |
| 2015/0260013 A1* | 9/2015 | Booker | E21B 34/066 166/250.01 |
| 2016/0208579 A1* | 7/2016 | Delzell | E21B 33/12 |

* cited by examiner

DETECTING A MOVEABLE DEVICE POSITION USING ELECTROMAGNETIC INDUCTION LOGGING

PRIORITY

The present application is a U.S. National Stage patent application of International Patent Application No. PCT/US2015/059492, filed on Nov. 6, 2015, the benefit of which is claimed and the disclosure of which is incorporated herein by reference in its entirety.

FIELD OF THE DISCLOSURE

Embodiments of present disclosure generally relate to the use of downhole moveable devices and, more particularly, to a method for detecting the operational position of a moveable device (e.g., sliding sleeve) using an electromagnetic induction based logging tool.

BACKGROUND

Moveable devices are used downhole to perform a number of functions. These devices may include, for example, chokes, sliding sleeves, and other valves. Sliding sleeve valves are used downhole to control and regulate fluids flow through tubulars. Controlling fluid flow is important for various economic reasons. For example, sliding sleeves can be used to shut off zones producing too much water or depleting hydrocarbons produced by other zones. Typically, sliding sleeve valves consist of an external housing that is threaded to the tubing string. The housing has openings, known as flow ports, to allow fluid flow into or out of the tubing. Inside the housing, there is a sliding sleeve, known as the insert, whose axial position with respect to the housing is adjustable to open or close the flow ports.

Sliding sleeves are either mechanically or hydraulically actuated. Mechanical actuation involves using a lock that is run in the well on a wireline, coiled tubing or slickline tool. The lock engages onto a nipple in the sliding sleeve, and is then used to adjust the position of the sleeve. Hydraulic actuation involves using a hydraulic pump at the surface and more complicated actuation mechanisms.

In all cases, it is highly desirable to detect the operational condition of the sleeve (open/closed/partially open) after actuation. Historically, this was done by mechanically sensing the gap between the endpoint of the insert and the housing. Such mechanical detection involves using deployable arms and in contact measurements. It can, therefore, be unreliable and difficult to interpret in many cases.

Methods to detect the position of sliding sleeves using magnets and wireline or memory tools were disclosed in U.S. Patent App. Publication No. 2008/0236819 (Foster et al.), entitled "Position sensor for determining operational condition of downhole tool", and U.S. Pat. No. 7,810,564 (Montgomery et al.), entitled "Memory logging system for determining the condition of a sliding sleeve." These methods involve disposing magnets in predetermined positions along the sliding sleeve housing and insert, and using a magnetic field detection tool, such as casing collar locator, to detect the relative position between these magnets, from which the operational condition of the sleeve is inferred. Another method was disclosed in U.S. Pat. No. 7,000,698 (Mayeu et al.), entitled "Methods and systems for optical endpoint detection of a sliding sleeve valve," whereby fiber optic based sensors where utilized for endpoint detection of sliding sleeves. The optical sensors are positioned in a recess in the valve housing, and are used to detect the stress imparted by the moving sleeve.

The drawback of all the above methods is that they only work for customized sliding sleeves equipped with magnets or optical sensors. This increases the cost and complexity of the sliding sleeves in new deployments, and makes the detection methods unusable for existing deployments having conventional sleeves.

DESCRIPTION OF ILLUSTRATIVE EMBODIMENTS

Illustrative embodiments and related methods of the present disclosure are described below as they might be employed in a method for detecting the operational position of a moveable device using electromagnetic induction-based logging. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative methods of the present disclosure are directed to detecting the operational position of a downhole moveable device using electromagnetic ("EM") induction logs. Although this description discusses sliding sleeves, the present disclosure is applicable to a variety of moveable devices, such as, for example, chokes, valves, and other downhole moveable devices. In an illustrative generalized method, an EM induction logging tool is deployed downhole inside wellbore tubing that includes a sliding sleeve assembly. The logging tool emits EM fields into the wellbore which induces current in the sliding sleeve assembly. The induced current emits secondary EM fields which are detected by the logging tool as one or more response signals. Using the response signals, the operational position of the sliding sleeve can be detected. The operational position is determined by comparing a log of response signals acquired while the sleeve is in a non-actuated position (i.e., baseline log) to a log of response signals acquired while the sleeve is in an actuated position (i.e., response log). Note, however, as described herein the baseline log may simply refer to a first log, while the response log refers to a subsequent log.

The electromagnetic induction logging tools described herein may take various embodiments. For example, the logging tool may be an electromagnetic corrosion detection tool. In general, however, the EM logging tool induces eddy current in the surrounding tubing and the sliding sleeve assembly, and measures the secondary EM fields generated by and emitting from the eddy current. The secondary EM fields vary with the thickness of the metal walls. During operation of a generalized method described herein, as the EM logging tool is run into the wellbore, at least one transmitting coil is used to emit an EM field into the surrounding wellbore, which in turn induces current in the surrounding tubing. As the transmitter induces eddy currents inside the metallic pipes, a receiving coil records secondary EM fields generated from the pipes. The secondary fields bear information about the electrical properties and metal content of the pipes, and can be inverted for corrosion or any change in the diameter or thickness of the pipes.

In certain methods, a baseline log is recorded before the sleeve is actuated. After actuation, another log is recorded. Comparison of the two logs enables the detection of the distance the sleeve moved after actuation. Given the dimensions of the sleeves and the maximum displacement they can move, the distance the sleeves moved after actuation relative to the baseline is correlated to the operational condition of the sleeves (open/closed/partially open).

In the methods described herein, the baseline log may be generated in a variety of ways. For example, the baseline log can be made at the surface before deployment when the operational position of each sleeve is known. As such, the distance the sleeve moved after actuation relative to the baseline can be precisely related (e.g., using inversion) to the operational position of the sleeves. In other methods, the baseline log may be taken from a library of baseline logs compiled before deployment of the sleeve. In yet another method, the baseline log may be generated downhole in the wellbore before the sleeve is actuated.

Figure 1A:
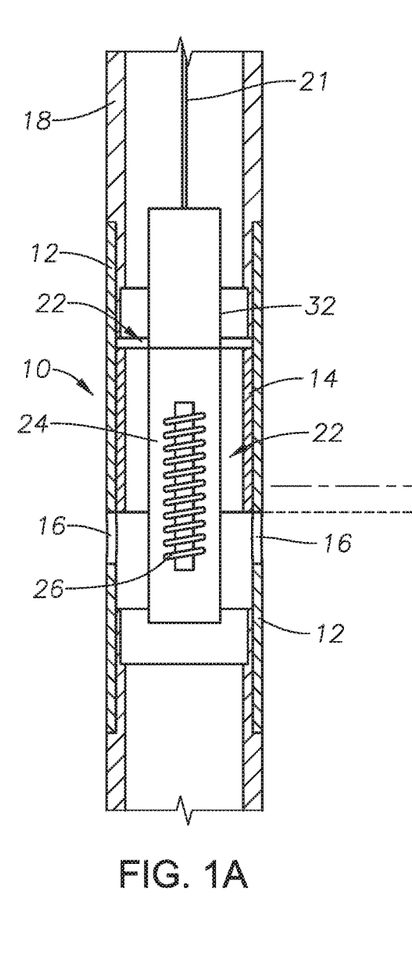
FIGS. 1A, 1B and 1C are sectional views of a electromagnetic induction-type logging tool positioned within a sliding sleeve assembly in a fully open, partially closed, and fully closed operational position, respectively, according to certain illustrative embodiments of the present disclosure.
Figure 1B:
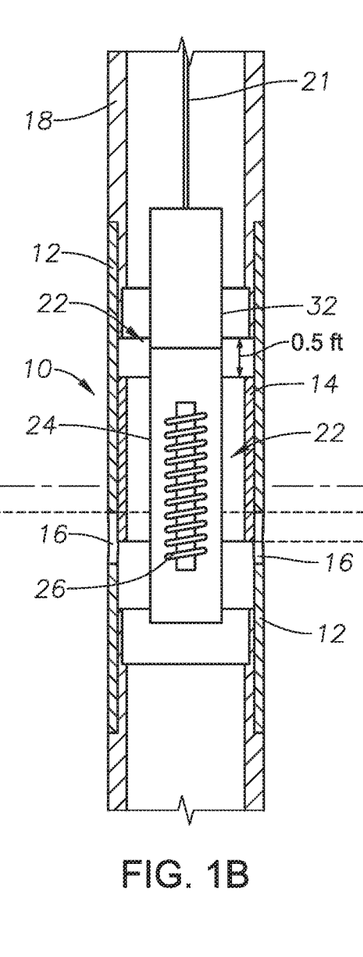
Figure 1C:
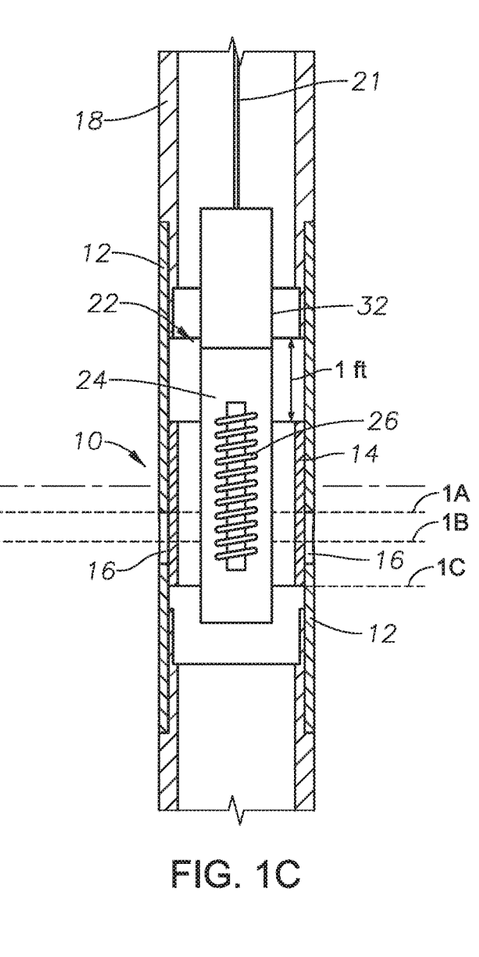

FIGS. 1A, 1B and 1C are sectional views of a EM induction-type logging tool positioned within a sliding sleeve assembly in a fully open, partially closed, and fully closed operational position, respectively, according to certain illustrative embodiments of the present disclosure. Sliding sleeve assembly (e.g., valve) 10 consists of an external housing 12, a sliding sleeve 14, and flow ports 16. Housing 12 is threaded to a tubing string 18, such as, for example, a casing string, which is filled with tubing fluids. Sliding sleeve assembly 10 may contain other internal components, such as, for example, top and bottom internal collars (not shown) used to limit the stroke of the sliding sleeve.

Still referring to FIGS. 1A-1C, an EM induction-type logging tool 22 is suspended from wireline 21 and positioned inside sliding sleeve assembly 10 (shown in an open-position in FIG. 1A). Logging tool 22 includes a tool body 24, centralizers (not shown), and one or more EM field transmitting/receiving coils 26. Although illustrate as one coil, note that the transmitting and receiving coils may be one or more separate coils. For example, coils 26 may be two separate transmitter and receiver coils, collocated transmitter and receiver coils (different radius for transmitter and receiver, but same axial location), or transceivers (same antenna shared by both electronics). In one embodiment, the transmitting coil is located at the lower end of tool 22, while the receiving coil is located at an upper end of tools 22. Therefore, during operation, the transmitting coil descends ahead of the receiving coil. The receiving coil detects the secondary EM field (i.e., response signals). Thereafter, the response signal data is converted to measured signals utilized by on-board or remote processing circuitry to determine the operational position of the sliding sleeve.

As EM induction logging tool 22 is logged past sliding sleeve assembly 10, a change in the recorded signal (log) is witnessed, reflecting the change in diameter and wall thickness of sliding sleeve assembly 10 from that of the tubing. Such a change is reflected in FIG. 1D, which shows a log of EM signal level verses depth for an open (FIG. 1A), partially closed (FIG. 1B), and fully closed (FIG. 1C) sleeve assembly. Part of the sleeve response is due to stationary features of tubing 18 or sliding sleeve assembly 10, such as housing 12 and other stationary internal components (referred to as tubing and housing response in FIG. 1D). The stationary features are independent of the sliding sleeve position. Another portion of the sleeve response is due to sliding sleeve 14 (i.e., sliding sleeve response). The sliding sleeve response varies with the position of sliding sleeve 14, as indicated by the 3 dotted lines showing the alignment of sleeve 14 in FIGS. 1A-1C with their respective signal levels in FIGS. 1D-1E. In general, for any sleeve position, there exists a unique EM signal pattern (i.e., signature) which is the combination of signals due to stationary and movable features in sliding sleeve assembly 10.

An intervention tool 32 is positioned above logging tool 22. Intervention tool 32 is utilized to actuate sliding sleeve 14 between open and closed positions, as will be described in more detail below. Intervention tool 32 is also comprised of non-conducting material on the outside between the electrodes to avoid shorting of current, and may include a variety of actuation mechanisms, such as, for example, "catching" mechanisms actuated with shear or release forces, "collet" mechanisms that are actuated based on applied pressure which in combination with tool weight exceeds the threshold for releasing.

Figure 1D:
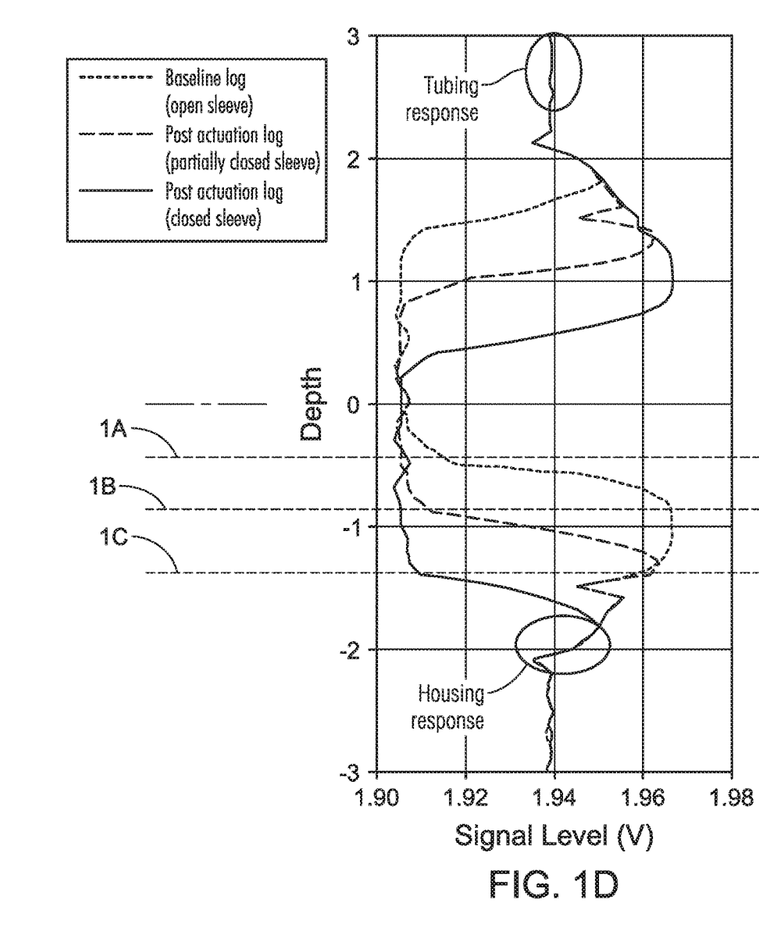
FIG. 1D depicts a log of electromagnetic signal level verses depth for an open, partially closed, and fully closed sleeve assembly.

Therefore, in order to detect the operational condition of sliding sleeve 14, in certain methods, a baseline log is first recorded before sleeve 14 is actuated (e.g., open sleeve log of FIG. 1D). After actuation, a second log (i.e., response log) is recorded and compared with the baseline log (in FIG. 1D, the response log may be the partially closed or closed sleeve logs). The distance sleeve 14 has traveled upon actuation can be detected by comparing the two logs. In certain illustrative methods, the amplitude of the two logs is normalized to eliminate any drifts in the signal level from one measurement to the other. For this normalization, a flat response of the tubing can be utilized.

In order to extract the sleeve displacement from the comparison of the baseline and response logs, both logs have to be well aligned (with respect to the true depth). In certain methods, alignment may be accomplished by aligning parts of the sleeve assembly EM response signal that are due to stationary features. In FIG. 1D, for example, this may be the portion of the response log representing the stationary housing 12 ("housing response"). This is an accurate method by which to align since it relies on features in sliding sleeve assembly 10 in close vicinity to sliding sleeve 14, and hence it is less vulnerable to depth drifts in the measured logs. When logging a sleeve assembly having multiple sleeves, the alignment process can be done for each sleeve independently if needed.

In an alternate method, the baseline and response logs may be aligned by using features in the hosting tubing 18, such as collars, for example. The closest collar to each sleeve 14 can be used to locally align the logs at the respective sleeves. This method works accurately as long as the collars are within sufficiently small distances (e.g., ~30 ft. or less) from sleeves 14.

In yet another method, the baseline and response logs may be aligned using features in the wellbore formation logged by tool 22, which has the capability to look behind the tubing and the casing, such as a gamma tool, for example. If a gamma tool is included in the logging tool string, gamma logs in the vicinity of each sleeve assembly 10 can be used to locally align the EM induction logs at the respective sleeves 14.

Figure 1E:
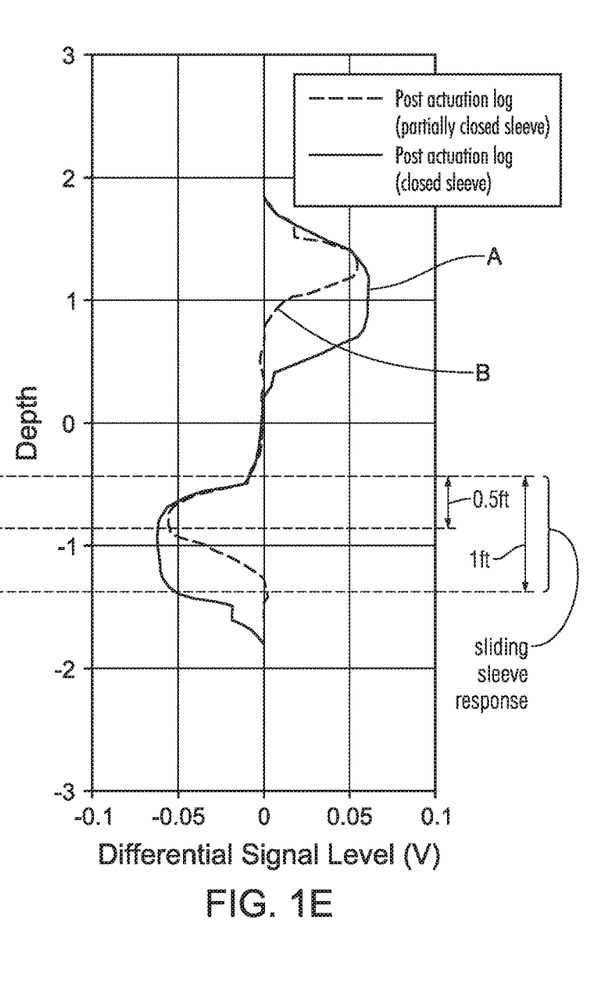
FIG. 1E illustrates the electromagnetic signal level verses depth of two differential logs (A/B) of a baseline and response log taken from FIG. 1D.

Once the baseline and response logs are aligned, they are compared to detect the displacement of sliding sleeve 14. In certain illustrative methods, the comparison may be performed by subtracting the baseline log from the response log. FIG. 1E illustrates the EM signal level verses depth of two differential logs (A/B) of a baseline and response log taken from FIG. 1D. Note, again, that the baseline log may simply be a first log, while the response log is a second log. In FIG. 1E, two differential logs are shown; however, only one differential log is needed to determine the operational position of the sleeve. The differential logs reflect the differential response between two logs (any first baseline and second response log) of FIG. 1D. For example, the baseline and partially closed logs of FIG. 1D may be reflected in one of the differential logs of log of FIG. 1E. Reviewing FIG. 1E, it can be seen that the operational position of the sleeve of differential log A has traveled a distance of 1 feet, while the sleeve of differential log B has traveled a distance of 0.5 feet.

Given the dimensions of the sleeves and the maximum displacement they are allowed to move, the distance the sleeves move after actuation relative to the baseline can be related to the operational condition of the sleeves (e.g., open/closed/partially open). If the distance traveled by the sleeve is equal to the maximum displacement the sleeve can move, then the operation condition of the valve can be precisely determined as either fully open or fully closed. Otherwise, if the distance traveled by the sleeve is less than the maximum displacement, the operational condition of the valve cannot be determined unless the baseline condition is known. Once the baseline is known, the distance the sleeve has traveled can be correlated to the true depth, and then the operational position of the sleeve can be determined.

Therefore, in certain illustrative methods of the present disclosure, the initial operational position of the sliding sleeves can be determined with high degree of certainty by actuating the sleeves several times to either fully open or fully closed position (for example, in mechanically actuated sleeves, the lock is engaged and hammered several times to make sure that the sleeve is open or closed). After this is done, the sliding sleeve assembly is logged to establish the baseline log. Note that, in certain methods, this baseline log can be generated at the surface before the sleeve assembly is deployed, or this log can be performed downhole after the sleeve assembly has been deployed. A known baseline can be also be achieved by using more conventional (but less reliable and accurate) methods of measuring the sliding sleeve movement such as by monitoring the changes in the pressure of the well as a function of time. After the baseline measurement is performed, position of the sleeve can be tracked by adding together the displacements that are measured.

Figure 2:
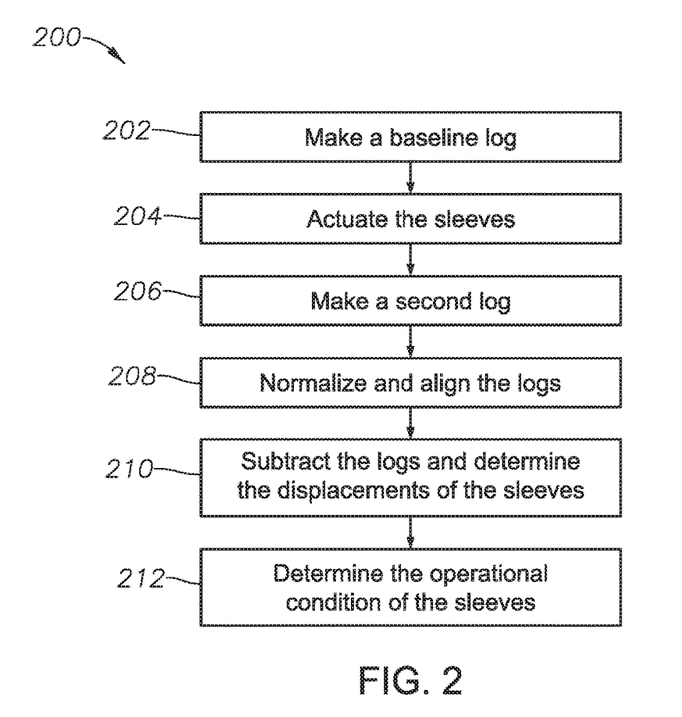
FIG. 2 is a flowchart of a method for detecting the operational condition of the sleeves using two in-situ logs, according to certain illustrative methods of the present disclosure.

FIG. 2 is a flowchart of a method 200 for detecting the operational condition of a moveable device (e.g., sliding sleeve) using two in-situ logs, according to certain illustrative methods of the present disclosure. As previously stated, the operational position of a variety of moveable devices may be determined using the methods described herein. Such devices may include, for example, a gas choke or sliding sleeve. Thus, in method 200 a sliding sleeve is described. After the EM induction-based logging tool has been deployed downhole, method 200 begins with estimating the initial operational position of the sliding sleeve (e.g., fully closed or open). At block 202, the logging tool logs the sliding sleeve assembly to generate the baseline log. At block 204, the sleeve is then actuated to another operational position using, for example, intervention tool 32 or some remote means (e.g., hydraulic line). At block 206, the logging tool then logs the sleeve assembly a second time to generate the response log. At block 208, the baseline and response logs are normalized and aligned. At block 210, the baseline and response logs are subtracted, whereby the displacement of the sleeve is determined (as described in relation to FIG. 1E). At block 212, the operational position of the sleeve is then determined.

Figure 3:
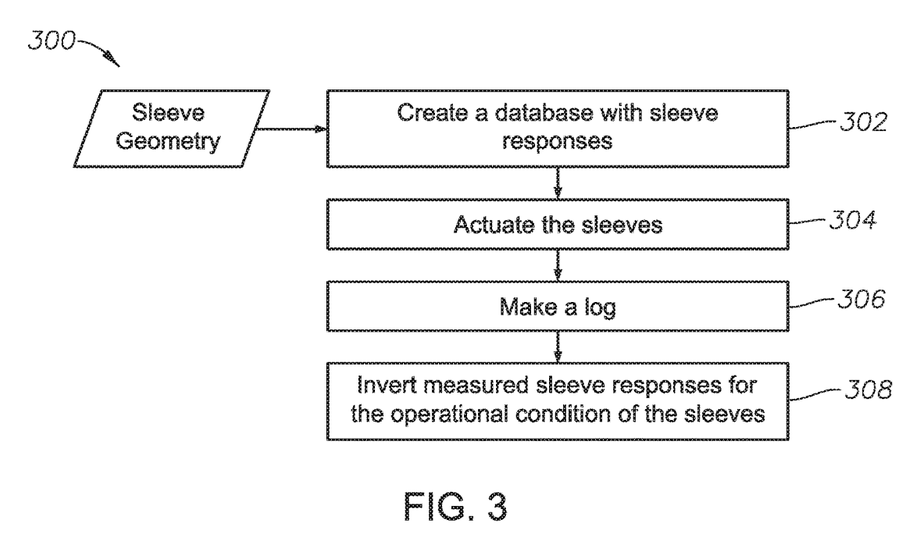
FIG. 3 is a flow chart of method 300 in which a baseline log library is utilized, according to certain illustrative methods of the present disclosure.

As mentioned before, the uncertainty in the operational position of the baseline log (when logged in-situ) can cause ambiguity in detecting the operational position of the sleeve when using the method of FIG. 2. Accordingly, FIG. 3 is a flow chart of method 300 in which a baseline log library is utilized. In order to eliminate the ambiguity with an in-situ baseline log, pre-deployment surface characterization of the sleeve response, including sleeve geometry, can be made and stored in a baseline log library. According to this alternative method, a database (i.e., baseline log library) is created which includes the EM responses of the sleeve at all operational positions (block 302). After deployment, the sleeve is actuated at block 304. To detect the operational position of deployed sleeves, only one response log is made (no in-situ baseline log is needed in this case) at block 306. At block 308, the response of each sleeve in the log is inverted for the operational position of that sleeve. Inversion may be performed in a variety of ways, including, for example, performing pattern recognition techniques between the measured response and those stored in the library. Note that different libraries with be required for different types of sleeves. Therefore, in this method, the type of sleeve used downhole needs to be known a priori to in order to apply the correct database for inversion.

The methods described herein may be performed using processing circuitry located at the surface, along the downhole assembly, or forming part of the logging tool itself. Regardless of the position of the processing circuitry, it is communicably coupled to the transmitting/receiving coils using any desired communication technique. Although not shown, the processing circuitry may include at least one processor, a non-transitory, computer-readable storage (also referred to herein as a "computer-program product"), transceiver/network communication module, optional I/O devices, and an optional display (e.g., user interface), all interconnected via a system bus. Software instructions executable by the processor for implementing the illustrative methods described herein, may be stored in the local storage medium or some other computer-readable medium.

Moreover, those ordinarily skilled in the art will appreciate that embodiments of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. Embodiments of the disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

As previously described, the EM induction-type logging tools used herein may take a variety of forms. For example, the EM induction tools may be frequency-domain tools that operate at discrete sets of frequencies, typically ranging from few Hz to few MHz (higher frequencies to inspect inner pipes and lower frequencies to inspect outer pipes). Alternatively, the EM induction tools may operate in the time-domain by transmitting transient pulses and measuring the decay response versus time (earlier time corresponds to inner pipes and later time corresponds to outer pipes).

Referring back to FIGS. 1A-1E, an illustrative model of the present disclosure was conducted and will now be described. The following model parameters were used:
1. Tubing: 5" OD, 0.2" thick, carbon steel (conductivity=$10^7$ S/m, relative permeability=100).
2. Sliding sleeve housing: 5.2" OD, 0.2" thick, 5 ft. long, carbon steel.
3. Sliding sleeve insert: 4.8" OD, 0.2" thick, 2 ft. long, carbon steel.
4. Internal collars: 4.8" OD, 0.05" thick, 0.5 ft. long, carbon steel.
5. Transmitter/receiver coils: 2"/1" diameter, 6" long. 100 turns, injected current=0.1 A.
6. Tubing fluid resistivity=100 Ohm.m.
7. Frequency=100 kHz.
8. Logging vertical resolution=0.1 ft.

The baseline and the post-actuation logs (i.e., response log) are shown in FIG. 1D after alignment and normalization. The differential logs obtained, by subtracting off the baseline, are shown in FIG. 1E. The width of the differential signal corresponds to the sleeve displacement (1 foot for differential log A, 0.5 feet for differential log B in FIG. 1E.)

The signals shown in FIG. 1D are obtained in the frequency-domain, and represent the total signal (direct signal+ tubing and sleeve signals). In certain illustrative embodiments with small transmitter or receiver axial spacing, the sensitivity of EM response signal measurements to sleeves can be increased by using a bucking coil to cancel out the direct signal. Alternatively, measurements can be acquired in the time-domain by transmitting transient pulses and measuring the decay response versus time. Transient pulses exhibit the unique property of self-bucking; meaning that, the measurable decay response at late time has significantly less contribution from direct signal.

In another embodiment of the present disclosure, instead of using a wireline tool, a slickline tool can be used. In this case, the tool is equipped with batteries for power and memory for storing the logs, also referred to as a "memory tool." In yet other embodiments, the logging tool may be utilized in a drilling or other downhole assembly. Additionally, sliding sleeves are typically in the order of 3-5 ft. Therefore, in certain methods, to detect the sleeve position accurately, the tool is logged in steps of 0.5 ft. or less.

Figure 4A:
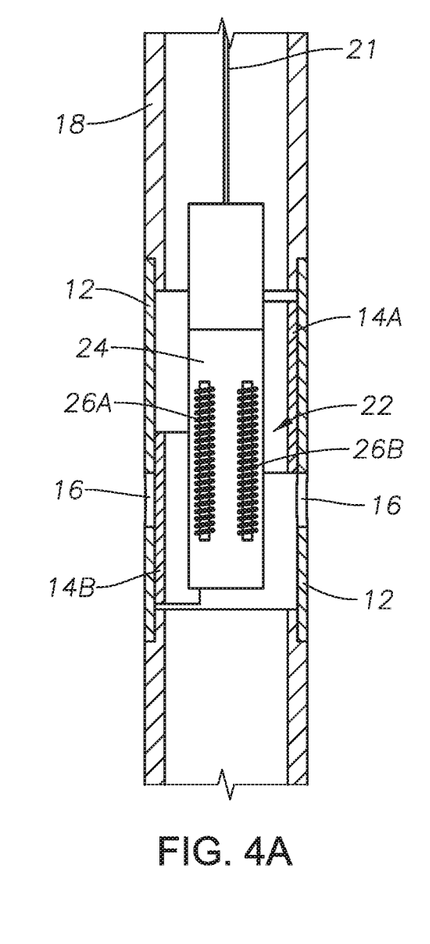
FIGS. 4A and 4B illustrate logging tools that azimuthally determine the operational position of multiple sliding sleeves, according to certain illustrative embodiments of the present disclosure.
Figure 4B:
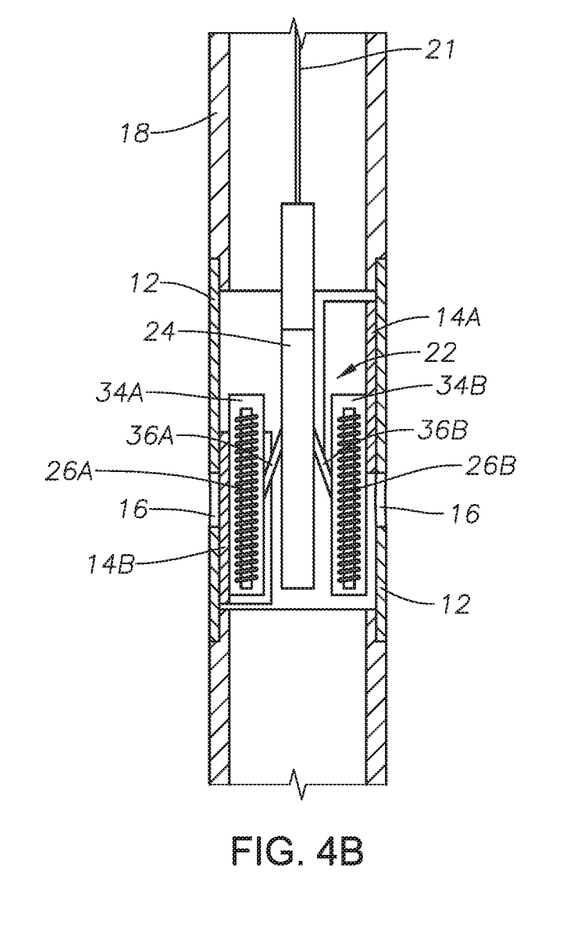

FIGS. 4A and 4B illustrate logging tools that azimuthally determine the operational position of multiple sliding sleeves, according to certain illustrative embodiments of the present disclosure. EM induction logging tool 22 of FIGS. 4A-B is somewhat similar to previous logging tool described herein and, therefore, may be best understood with reference thereto, where like numerals indicate like elements. However, in this embodiment, logging tool 22 utilizes multiple EM transmitting/receiving coils 26A-B. In certain sliding sleeve assemblies, multiple sleeves exist within the same assembly to independently control flow from different ports, as shown in FIGS. 4A-B. Azimuthal detection of the operational condition of multiple sleeves 14A and 14B can be achieved by loading logging tool 22 with multiple azimuthally distributed EM transmitting/receiving coils 26A-B.

EM transmitting/receiving coils 26A-B may be contained within tool body 24, as shown in FIG. 4A, or can be loaded in pads 34A-B that are pressed against the inner wall of the tubing using deployable arms 36A-B. These azimuthally sensitive embodiments provide a 2-D (axial and azimuthal) image of the inside of the tubing. This image reflects any variation in the inner diameter or thickness of the tubing, from which the condition of different sliding sleeves 14A-B (at different azimuthal and/or axial locations) can be detected using the same illustrative processes described earlier in this disclosure.

Figure 5:
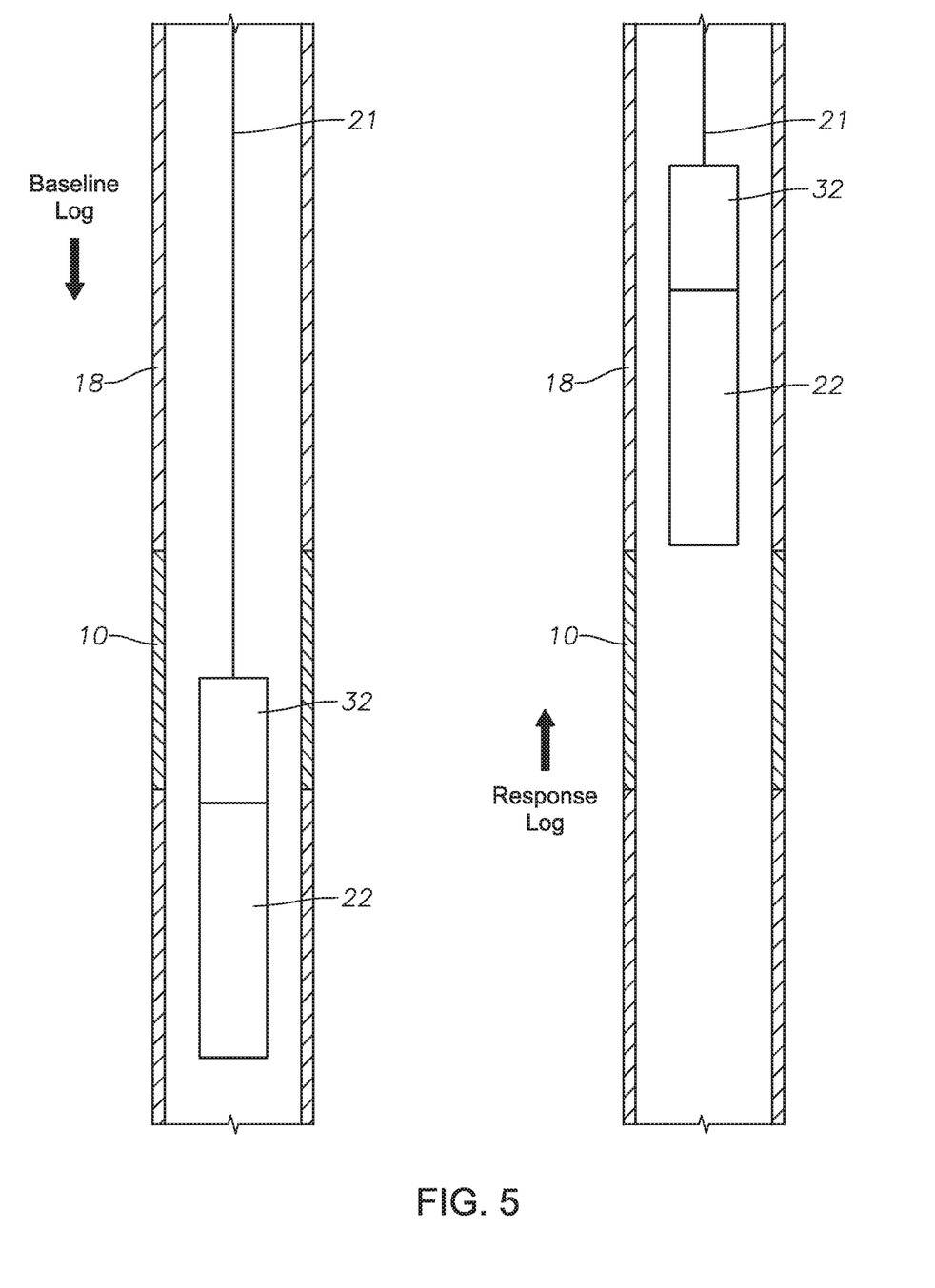
FIG. 5 illustrates a logging operation performed according to certain illustrative methods of the present disclosure.

FIG. 5 illustrates a logging operation performed according to certain illustrative methods of the present disclosure. Here, sliding sleeve assembly 10 has been deployed along tubing 18 as previously described. EM induction-type logging tool 22 and intervention tool 32 have also been deployed downhole. In this example, a baseline log is first generated by logging tool 22 downhole past assembly 10. After logging tool 22 passes assembly 10, intervention tool 32 is then used to actuate the operational position of the sleeve (not shown) of assembly 10. Thereafter, in an uphole direction, logging tool 22 is logged up past assembly 10 in order to generate the response log. Then, as previously described, the logs are compared whereby the operational position of the sleeve can be determined.

Although not shown, in those embodiments whereby a baseline log library is utilized, the logging tool may only be logged one past sliding sleeve assembly 10 in order to generate the response log. Moreover, the method described in relation to FIG. 5 is illustrative in nature, as other methods may be utilized.

Accordingly, the illustrative embodiments and methods described herein provide a variety of advantages. First, for example, the disclosed methods do not require any customized sleeves or any modifications to existing sleeves. Second, the disclosed methods can work with any EM induction-based logging tool (e.g., wireline and slickline tools), i.e., does not require customized logging tools. Third, logging imagers can be used to detect the operational condition of different azimuthally distributed sleeves. Fourth, the disclosed methods obviate any need for mechanical sensing of the gap between the endpoint of the insert and the housing, as such conventional mechanical sensing can be unreliable and difficult to interpret. Fifth, the displacement of the sleeves can be detected using simple processing; no sophisticated inversion is needed.

Embodiments described herein further relate to any one or more of the following paragraphs:

1. A method for detecting a position of a downhole moveable device, the method comprising emitting an electromagnetic ("EM") field into a wellbore, thereby inducing current in a moveable device which produces secondary electromagnetic fields that emits from the moveable device; detecting the secondary electromagnetic fields as response signals; and determining an operational position of the moveable device using the response signals.

2. A method as defined in paragraph 1, wherein determining the operational position comprises using one or more response signals to generate a response log of the moveable device; comparing the response log with a baseline log of the moveable device; and determining the operational position of the moveable device based upon the comparison.

3. A method as defined in paragraphs 1 or 2, wherein the baseline log is generated at a surface location.

4. A method as defined in any of paragraphs 1-3, wherein the baseline log is generated within the wellbore.

5. A method as defined in any of paragraphs 1-4, wherein the baseline log is generated before the moveable device is actuated; and the response log is generated after the moveable device is actuated.

6. A method as defined in any of paragraphs 1-5, wherein comparing the response log with the baseline log comprises using a pattern recognition technique to perform the comparison.

7. A method as defined in any of paragraphs 1-6, further comprising aligning the response log and baseline log with respect to true depth.

8. A method as defined in any of paragraphs 1-7, wherein the moveable device is a sliding sleeve that forms part of a sliding sleeve assembly; and the alignment is achieved by aligning portions of the response log and baseline log representing stationary features of the sliding sleeve assembly.

9. A method as defined in any of paragraphs 1-8, wherein the alignment is achieved by aligning portions of the response log and baseline log representing features of a tubing along which the moveable device is positioned.

10. A method as defined in any of paragraphs 1-9, wherein the feature is a collar.

11. A method as defined in any of paragraphs 1-10, wherein the alignment is achieved by aligning portions of the response log and baseline log representing a wellbore formation.

12. A method as defined in any of paragraphs 1-11, wherein determining the operational position comprises using one or more response signals to generate a response log of the moveable device; comparing the response log to a baseline log library, the baseline log library containing logs comprising response signals of the moveable device at a plurality of operational positions; and determining the operational position of the moveable device based upon the comparison.

13. A method as defined in any of paragraphs 1-12, further comprising cancelling a direct signal from the response signals.

14. A method as defined in any of paragraphs 1-13, wherein: emitting the EM field is achieved using a transmitting coil of a logging tool; and detecting the secondary EM fields is achieved using a receiving coil of the logging tool.

15. A method as defined in any of paragraphs 1-14, wherein the moveable device is a sliding sleeve; the baseline log is generated by moving a logging tool downhole past the sliding sleeve, the logging tool comprising an intervention tool to actuate the sleeve after the baseline log is generated; and the response log is generated by moving the logging tool uphole past the actuated sliding sleeve.

16. A method as defined in any of paragraphs 1-15, wherein determining the operational position comprises azimuthally determining the operational position the moveable device.

17. A method as defined in any of paragraphs 1-16, wherein a logging tool comprising multiple azimuthally distributed EM field coils is utilized to determine the operational position of the moveable device.

18. A method as defined in any of paragraphs 1-17, further comprising generating an image of downhole tubing based upon the azimuthally determined operational position of the moveable device.

19. A logging tool, comprising an electromagnetic ("EM") field transmitting coil; and an EM field receiving coil, wherein the transmitting and receiving coils are communicably coupled to processing circuitry to perform any of methods as defined in paragraphs 1-18.

20. A logging tool as defined in paragraph 19, wherein the transmitting coil is positioned at a lower end of the logging tool; and the receiving coil is positioned at an upper end of the logging tool.

21. A logging tool as defined in paragraphs 19 or 20, further comprising an intervention tool adapted to actuate a sliding sleeve between an open and closed position.

22. A logging tool as defined in any of paragraphs 19-21, wherein the processing circuitry forms part of the logging tool.

23. A logging tool as defined in any of paragraphs 19-22, further comprising deployable arms upon which the transmitting and receiving coils are positioned.

24. A logging tool as defined in any of paragraphs 19-23, wherein the logging tool forms part of a wireline, slickline, or drilling assembly.

Although various embodiments and methods have been shown and described, the disclosure is not limited to such embodiments and methods and will be understood to include all modifications and variations as would be apparent to one skilled in the art. For example, although sliding sleeves are described throughout this description, the methods are applicable to other downhole moveable devices as stated herein. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for detecting a position of a downhole moveable device, the method comprising:
   emitting an electromagnetic ("EM") field into a wellbore using a logging tool transmitter, thereby inducing current in a moveable device which produces secondary electromagnetic fields that emits from the moveable device;
   using a receiver of the logging tool to detect the secondary electromagnetic fields as response signals; and
   determining an operational position of the moveable device using the response signals, wherein determining the operational position comprises azimuthally determining the operational position of the moveable device.

2. A method as defined in claim 1, wherein determining the operational position comprises:
   using one or more response signals to generate a response log of the moveable device;

comparing the response log with a baseline log of the moveable device; and determining the operational position of the moveable device based upon the comparison.

3. A method as defined in claim 2, wherein the baseline log is generated at a surface location.

4. A method as defined in claim 2, wherein the baseline log is generated within the wellbore.

5. A method as defined in claim 2, wherein:

the baseline log is generated before the moveable device is actuated; and the response log is generated after the moveable device is actuated.

6. A method as defined in claim 2, wherein comparing the response log with the baseline log comprises using a pattern recognition technique to perform the comparison.

7. A method as defined in claim 2, further comprising aligning the response log and baseline log with respect to true depth.

8. A method as defined in claim 7, wherein:

the moveable device is a sliding sleeve that forms part of a sliding sleeve assembly; and the alignment is achieved by aligning portions of the response log and baseline log representing stationary features of the sliding sleeve assembly.

9. A method as defined in claim 7, wherein the alignment is achieved by aligning portions of the response log and baseline log representing features of a tubing along which the moveable device is positioned.

10. A method as defined in claim 9, wherein the feature is a collar.

11. A method as defined in claim 7, wherein the alignment is achieved by aligning portions of the response log and baseline log representing a wellbore formation.

12. A method as defined in claim 1, wherein determining the operational position comprises:

using one or more response signals to generate a response log of the moveable device;

comparing the response log to a baseline log library, the baseline log library containing logs comprising response signals of the moveable device at a plurality of operational positions; and determining the operational position of the moveable device based upon the comparison.

13. A method as defined in claim 1, further comprising cancelling a direct signal from the response signals.

14. A method as defined in claim 2, wherein:

the moveable device is a sliding sleeve;

the baseline log is generated by moving a logging tool downhole past the sliding sleeve, the logging tool comprising an intervention tool to actuate the sleeve after the baseline log is generated; and the response log is generated by moving the logging tool uphole past the actuated sliding sleeve.

15. A method as defined in claim 1, wherein a logging tool comprising multiple azimuthally distributed EM field coils is utilized to determine the operational position of the moveable device.

16. A method as defined in claim 15, further comprising generating an image of downhole tubing based upon the azimuthally determined operational position of the moveable device.

17. A logging tool, comprising:

an electromagnetic ("EM") field transmitting coil; and an EM field receiving coil, wherein the transmitting and receiving coils are communicably coupled to processing circuitry to perform any method as defined in any one of claims 1-14, 15 or 15-16.

18. A logging tool as defined in claim 17, wherein:

the transmitting coil is positioned at a lower end of the logging tool; and the receiving coil is positioned at an upper end of the logging tool.

19. A logging tool as defined in claim 17, further comprising an intervention tool adapted to actuate a sliding sleeve between an open and closed position.

20. A logging tool as defined in claim 17, wherein the processing circuitry forms part of the logging tool.

21. A logging tool as defined in claim 17, further comprising deployable arms upon which the transmitting and receiving coils are positioned.

22. A logging tool as defined in claim 17, wherein the logging tool forms part of a wireline, slickline, or drilling assembly.

* * * * *